March 8, 1938. A. CHIERA 2,110,500
METHOD OF AND MEANS FOR PRODUCING WHITE LIGHT OR DAYLIGHT
Filed Nov. 23, 1936
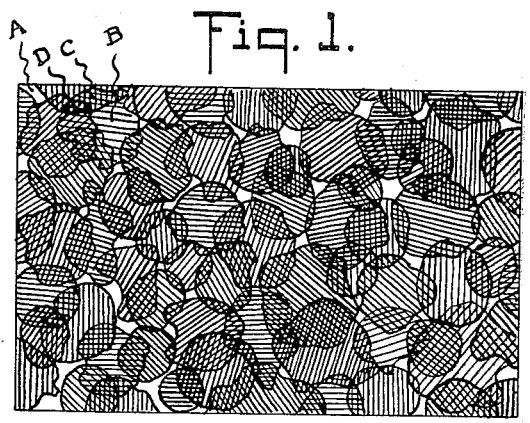
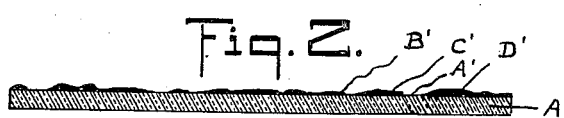
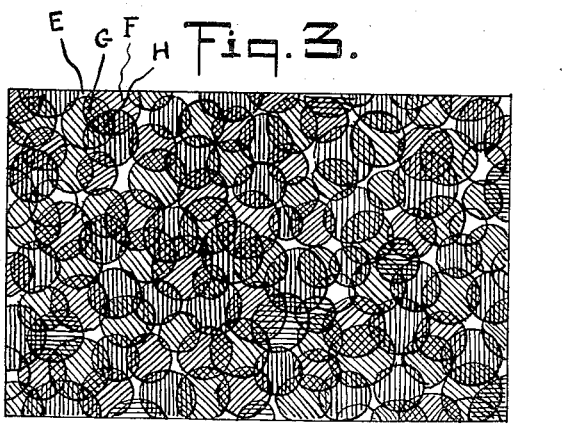
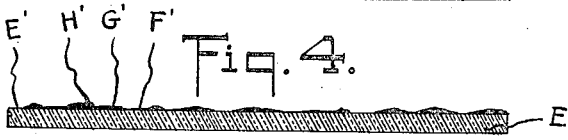
INVENTOR
Albert Chiera Patented Mar. 8, 1938

2,110,500

UNITED STATES PATENT OFFICE 2,110,500

METHOD OF AND MEANS FOR PRODUCING WHITE LIGHT OR DAYLIGHT

Albert Chiera, Washington, D. C.

Application November 23, 1936, Serial No. 112,432

5 Claims. (Cl. 240—1.1)

The object of my invention is that of producing a light equivalent to daylight, or, to put it more accurately, of converting artificial light, emitted from incandescent filament lamps, from arcs, or from other sources, into a light closely approaching daylight.

In the light transmitted by an electric lamp bulb, an excess amount of the orange and red rays exist in its chromatic spectrum. To convert such a light into a closer approximation of daylight, uniform blue filters are generally used so that the excessive amount of these spectral colors is absorbed.

By said method, if the uniform blue glass filter is not sufficiently dense, so as to absorb a correct proportion of the red and orange rays, naturally, the transmitted light will not be white, but, if a denser uniform blue glass filter is used, so that a greater amount of these rays is absorbed, it does not follow that because of this greater absorption, the light transmitted will be whiter. On the contrary, it may be greenish-yellow or bluish, because too much of the red or orange rays have been absorbed.

White light is really composed of red, yellow and blue, and, an equal proportion of these colors must be present before white light will result.

Hence, to absorb a sufficient amount of the red and orange rays by a uniform blue filter, and at the same time allow a sufficient amount of these rays to pass through, I found very difficult to do, because of the limitation of the method used. Therefore, I hit upon the idea of scattering the blue color in the filter so that a general absorption of the red and orange rays would result, but at the same time. permitting these rays to pass through said filter from those points of it, where the color is applied very thinly, or where it is entirely lacking.

The glass surface of an electric lamp bulb is the base or foundation over which a blue coloring agent is scattered by "stippling" or by proper spraying.

This coloring medium consists of a mineral blue color mixed together with a suitable vehicle such as silicate of soda or potassium.

By the word "stippling" I means that a coat of flat color is applied over a surface, and while it is still wet, it is broken up by an up and down movement of the brush, so that the individual bristles or hairs of the brush will cause the color to be scattered into small points or dots of color which tend to run together.

For example, Fig. 1 shows the coloring agent stippled over the surface of a piece of glass A, so that particles of color of various densities are obtained, each of which blends together with its neighbours. At B, the color is the thinnest, heavier at C, and heaviest at D, while entirely lacking at A.

Fig. 2 shows a sectional view of the same piece of glass A over which the color is unevenly distributed, thinnest at B', heavier at C', and heaviest at D', and entirely lacking at A'.

Fig. 3 shows the color lightly sprayed over the surface of a piece of glass E, the color particles are smaller, but, the overlapping is clearly seen. At F the color is the thinnest, at G heavier, at H heaviest, while at E the color is missing.

Similarly at Fig. 4, showing a sectional view of a piece of glass E the color is the thinnest at F', heavier at G', and the heaviest at H', while lacking at E'.

Needless to say that the designs greatly magnify the color particles to show the various densities obtained.

In the actual process of stippling the particles of color are much more irregular in shape than the design shows, and the variations of densities more numerous.

In the spray the color is split up into very fine drops or particles of color which naturally assume a more circular and regular form.

Practically the same result obtained by stippling, can be had by spraying the color with a sprayer. The effect of the color scattered, shows in fact small points, or larger dots, according to whether the opening of the nozzle is very small or large. The partial overlapping of particles of color, or liquid color flying in small drops, will produce a gradation of shades, just as it appears in a stipple. In both cases there may be some points on the surface of an electric lamp bulb in which the color may be lacking, but these points are few and infinitesimal.

The main difference between the two methods lies in the fact that by scattering the color with a sprayer, its distribution is more mechanically perfect and finer, but in this latter case, the color must be thinly applied to conserve the effect of light and dark dots, which would be destroyed if a dense coat would be sprayed.

From the definition given above it is evident that the surface effect of the blue color produced by stippling or by proper spraying will differ from the effect of the same blue color when uniformly and evenly distributed over a surface; for example, in a sheet of blue glass, in which the color is an integral part of the glass itself, or in a blue bulb blown from liquid blue glass and known as a blue or daylight bulb, the color is homogeneously distributed, whereas in stipples it is broken up in various gradations of shade.

Just as the method of stippling the color on a surface, differs from that of applying the color evenly and smoothly so that no gradation of color occurs, similarly differ the effects of the light resulting from the two methods: by the latter the light is uniformly intercepted and absorbed by a single shade of blue, whereas, by the former, it is intercepted and absorbed by several shades obtained by the stipple. Similarly the same difference exists when the color is applied by spraying.

The several gradations of blue obtained by the stipple will cause the yellow-orange color of the illuminant to be absorbed in proportion to the various shades or densities present, so that different color rays will combine to produce a light equivalent to daylight.

Having given a full description of both the method and principle of this invention, I do not wish to limit it as applicable to incandescent electrical bulbs only, since identical effects could be obtained by using the same process on glass of whatever shape and size, surrounding an incandescent bulb or by using said process on a flat or convex plate of glass, in connection with an opaque or semi-opaque reflector.

Moreover, I found that the glass, whether pertaining to filament electric bulbs, globes, glass shades or flat or convex glass, need not necessarily be colorless, but they may be of a light blue or of a greenish-blue tone, in which case it would be best that the stippling blue color verge slightly toward the violet or have a suggestion of a violet-bluish tone.

For this reason I wish to vary the tone or quality of the blue used in the medium to suit any particular quality of light emanated from an incandescent clear bulb, or from a bulb, having a blue color, or from an arc or other illuminants, in order to produce a light equivalent to daylight in accordance with the principles of my invention.

Thus, it will be understood that nothing contained in the foregoing description is to be implied or construed as restricting the scope of the protection, hereby secured, in respect to a definite tone of blue used, of its quality of color or quantity thereof, or to the external form or other quality of design of lamps, globes or shades, or to the shape and size of the incandescent bulbs or to the entire or partial surface over which said medium is to be stippled or unevenly distributed by whatever method used.

The color or tone of the blue shall be limited within the Fraunhofer lines F and G of the normal solar spectrum.

I claim:

1. A light corrective filter which has a stippled effect, produced either by a brush or by a sprayer, over the surface of an electric lamp bulb, with a coloring agent of a mineral blue color, dissolved or suspended in a solution of sodium or potassium silicate or other heat resisting vehicle.

2. A light corrective filter, consisting of a heat resisting coloring agent, stippled over the surface of an electric lamp bulb, so as to obtain particles of color of various densities, each of which blends together with its neighbours.

3. A light corrective filter, consisting of a heat resisting coloring agent, sprayed over the outside or inside of an electric lamp bulb, so as to obtain particles of color of various densities, each of which blends together with its neighbours.

4. A light filter consisting of a heat resisting coloring agent stippled or sprayed over the surface of a light transmitting member so as to obtain particles of color of various densities, said filter being adapted for use with an artificial light source.

5. A light corrective filter consisting of a heat resisting blue coloring agent, sprayed or stippled over the surface of a blue electric lamp bulb, so as to obtain particles of color of various densities, each of which blends with its neighbours.

ALBERT CHIERA.